(12) United States Patent
Bhardwaj et al.

(10) Patent No.: US 10,454,749 B2
(45) Date of Patent: *Oct. 22, 2019

(54) METHOD AND APPARATUS TO TRACK GAIN VARIATION IN ORTHOGONAL FREQUENCY DIVISION MULTIPLEXING (OFDM) SYSTEMS

(71) Applicant: Edgewater Wireless Systems Inc., Ottawa (CA)

(72) Inventors: Manish Bhardwaj, Cambridge, MA (US); Garret Shih, Brookline, MA (US)

(73) Assignee: Edgewater Wireless Systems Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,885

(22) Filed: Jul. 27, 2017

(65) Prior Publication Data

US 2018/0077000 A1    Mar. 15, 2018

Related U.S. Application Data

(63) Continuation of application No. 15/148,550, filed on May 6, 2016, now Pat. No. 9,722,849, which is a
(Continued)

(51) Int. Cl.
*H04L 27/36* (2006.01)
*H04L 25/03* (2006.01)
(Continued)

(52) U.S. Cl.
CPC .......... *H04L 27/366* (2013.01); *H04L 5/0007* (2013.01); *H04L 25/03159* (2013.01);
(Continued)

(58) Field of Classification Search
CPC ................. H04L 27/366; H04L 5/0007; H04L 25/03159; H04L 27/261; H04L 27/2614;
(Continued)

(56) References Cited

U.S. PATENT DOCUMENTS

7,027,530 B2 * 4/2006 McFarland .......... H03G 3/3052
330/254
RE40,997 E * 11/2009 Sunaga .................. H04B 1/707
370/335
(Continued)

*Primary Examiner* — Patrick N Edouard
*Assistant Examiner* — Eboni N Giles
(74) *Attorney, Agent, or Firm* — Hamilton, Brook, Smith & Reynolds, P.C.

(57) ABSTRACT

Gain variations during a packet can lead to significant performance degradation in communications systems that use high order quadrature amplitude modulation (QAM). A method and the associated apparatus track such variations in an OFDM system and completely eliminate any performance degradation. Gain estimation and compensation is employed with the use of pilot subcarriers in the payload of an OFDM data packet. Estimated pilot magnitude ratios are averaged, throughout the processing life of a packet, to yield accurate gain estimations. A gain compensation factor is used to adjust data carriers. An exclusion method is also employed to eliminate pilot carriers which contribute to noise.

20 Claims, 6 Drawing Sheets

Related U.S. Application Data continuation of application No. 13/781,224, filed on Feb. 28, 2013, now Pat. No. 9,338,044, which is a continuation of application No. 11/522,793, filed on Sep. 18, 2006, now abandoned, which is a continuation-in-part of application No. 11/343,736, filed on Jan. 30, 2006, now abandoned, which is a continuation of application No. 11/202,930, filed on Aug. 12, 2005, now abandoned.

(60) Provisional application No. 60/601,099, filed on Aug. 12, 2004.

(51) Int. Cl.
*H04L 27/26* (2006.01)
*H04L 5/00* (2006.01)
*H04L 27/34* (2006.01)
*H04L 29/06* (2006.01)

(52) U.S. Cl.
CPC .......... *H04L 27/261* (2013.01); *H04L 27/265* (2013.01); *H04L 27/2614* (2013.01); *H04L 27/2647* (2013.01); *H04L 27/34* (2013.01); *H04L 69/22* (2013.01)

(58) Field of Classification Search
CPC ... H04L 27/2647; H04L 27/265; H04L 27/34; H04L 69/22
See application file for complete search history.

(56) References Cited

U.S. PATENT DOCUMENTS

| | | | |
|---|---|---|---|
| 7,746,938 B2* | 6/2010 | Hasegawa | H04L 5/026 375/260 |
| 9,338,044 B2 | 5/2016 | Bhardwaj | |
| 9,722,849 B2 | 8/2017 | Bhardwaj et al. | |
| 2003/0058951 A1* | 3/2003 | Thomson | H04L 27/2657 375/260 |
| 2003/0090993 A1 | 5/2003 | Sato | |
| 2003/0112825 A1* | 6/2003 | Wang | H04L 27/2657 370/491 |
| 2004/0001563 A1* | 1/2004 | Scarpa | H04L 27/2679 375/326 |
| 2004/0005018 A1* | 1/2004 | Zhu | H04L 27/2657 375/340 |
| 2004/0179494 A1* | 9/2004 | Attar | H04J 9/00 370/332 |
| 2006/0088112 A1* | 4/2006 | Das | H04L 27/261 375/260 |
| 2006/0133527 A1* | 6/2006 | Yu | H04L 27/2662 375/260 |
| 2006/0198449 A1* | 9/2006 | De Bart | H04L 25/0236 375/260 |
| 2013/0177058 A1* | 7/2013 | Bhardwaj | H04L 25/03159 375/224 |
| 2016/0330063 A1 | 11/2016 | Bhardwaj et al. | |

* cited by examiner

CALCULATED TRANSIENT ELECTRICAL RESPONSES
OF A SELF-HEATING DEVICE

METHOD AND APPARATUS TO TRACK GAIN VARIATION IN ORTHOGONAL FREQUENCY DIVISION MULTIPLEXING (OFDM) SYSTEMS

RELATED APPLICATIONS

This application is a continuation of U.S. application Ser. No. 15/148,550 filed May 6, 2016, which is a continuation of U.S. application Ser. No. 13/781,224 filed Feb. 28, 2013, now U.S. Pat. No. 9,338,044, which is a continuation of U.S. application Ser. No. 11/522,793, filed Sep. 18, 2006, which is a continuation-in-part of U.S. application Ser. No. 11/343,736, filed Jan. 30, 2006, which is a continuation of U.S. application Ser. No. 11/202,930, filed Aug. 12, 2005, which claims the benefit of U.S. Provisional Application No. 60/601,099, filed on Aug. 12, 2004. The entire teachings of the above applications are incorporated herein by reference.

BACKGROUND OF THE INVENTION

Frequency Division Multiplexing (FDM) is a technology, widely used in communication systems, which allows for the transmission of multiple signals simultaneously over a single transmission path. Each signal travels within its own unique frequency range, or carrier, which is modulated by the data (i.e., text, voice, video, etc.) to represent the information being transmitted.

Orthogonal Frequency Division Multiplexing (OFDM) is a technique which distributes data over several carriers that are spaced apart at precise frequencies. This spacing provides the orthogonality in this technique which prevents the demodulators from seeing frequencies other than their own.

Figure 1:
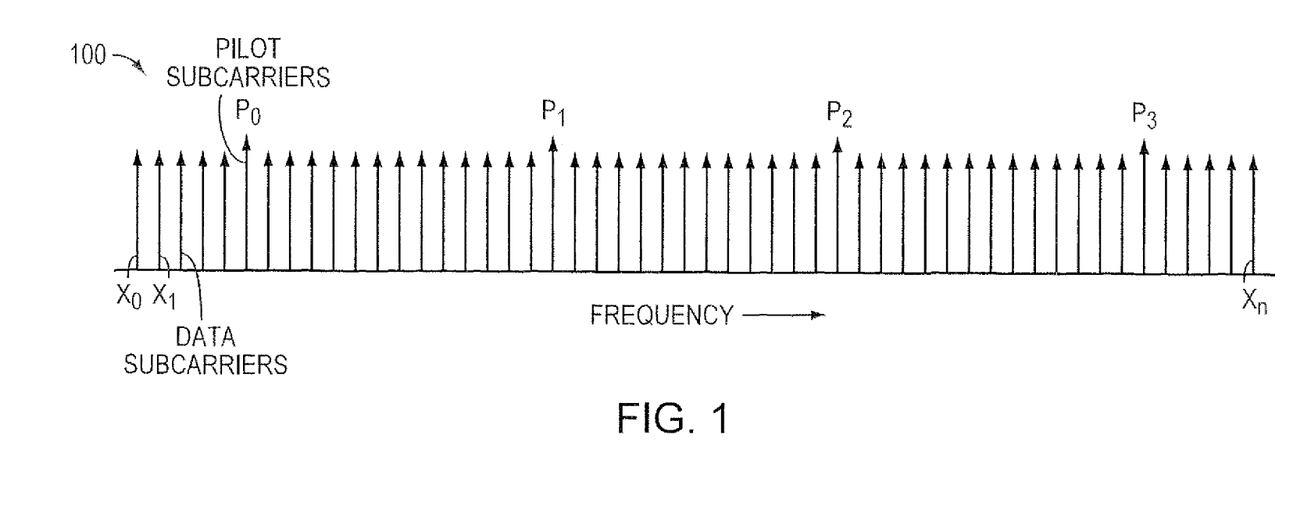
FIG. 1 is an illustrative example of an OFDM packet viewed from a frequency perspective.

From a frequency perspective, a typical OFDM packet structure 100 is divided into subcarriers, as shown in FIG. 1. These subcarriers are further classified into pilots ($P_n$) or data ($X_n$). Pilots are subcarriers whose value is known prior to the transmission of the packet. Knowing the value of the pilot subcarriers serves as a useful reference to estimate impairments throughout a packet.

In contrast to the pilot subcarriers, the value of data subcarriers is not known prior to the transmission of the packet. The data subcarriers hold the information which is to be transmitted, and is therefore unknown prior to transmission. Each data carrier has an associated pilot, which is typically the pilot that is closest to it in frequency. FIG. 1 shows the four pilots ($P_0$-$P_3$) and the associated data subcarriers for a 802.11 OFDM.

Figure 2:
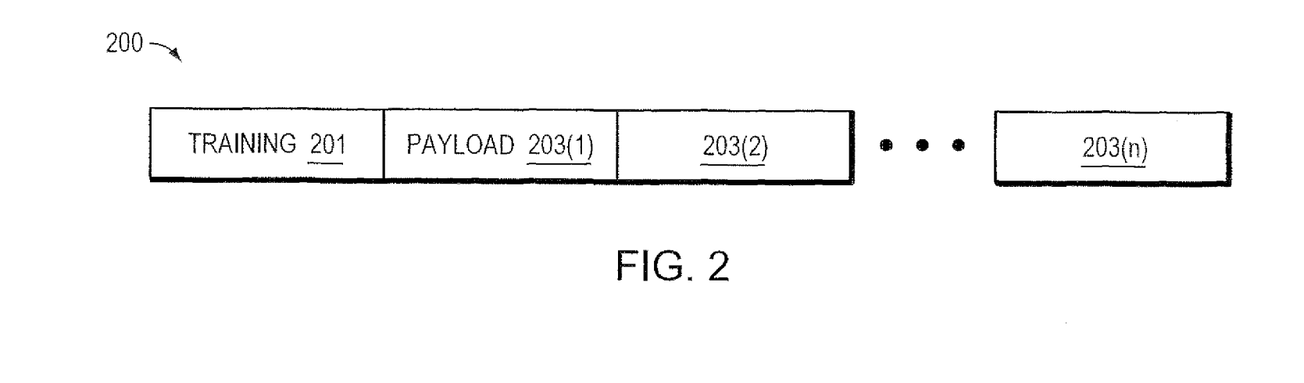
FIG. 2 is an illustrative example of an OFDM packet viewed from a time perspective.

From a time perspective, the OFDM packet 200 is divided into a sequence of OFDM symbols, as is shown in FIG. 2. At the start of the OFDM packet 200 is a training symbol 201, which is followed by a number of payload symbols 203(1)-203(n). All subcarriers (pilots and data) in the training symbol 201 are known prior to the transmission of the OFDM packet, wherein, only the pilots are known prior to transmission in the payload symbols 203.

Figure 3:
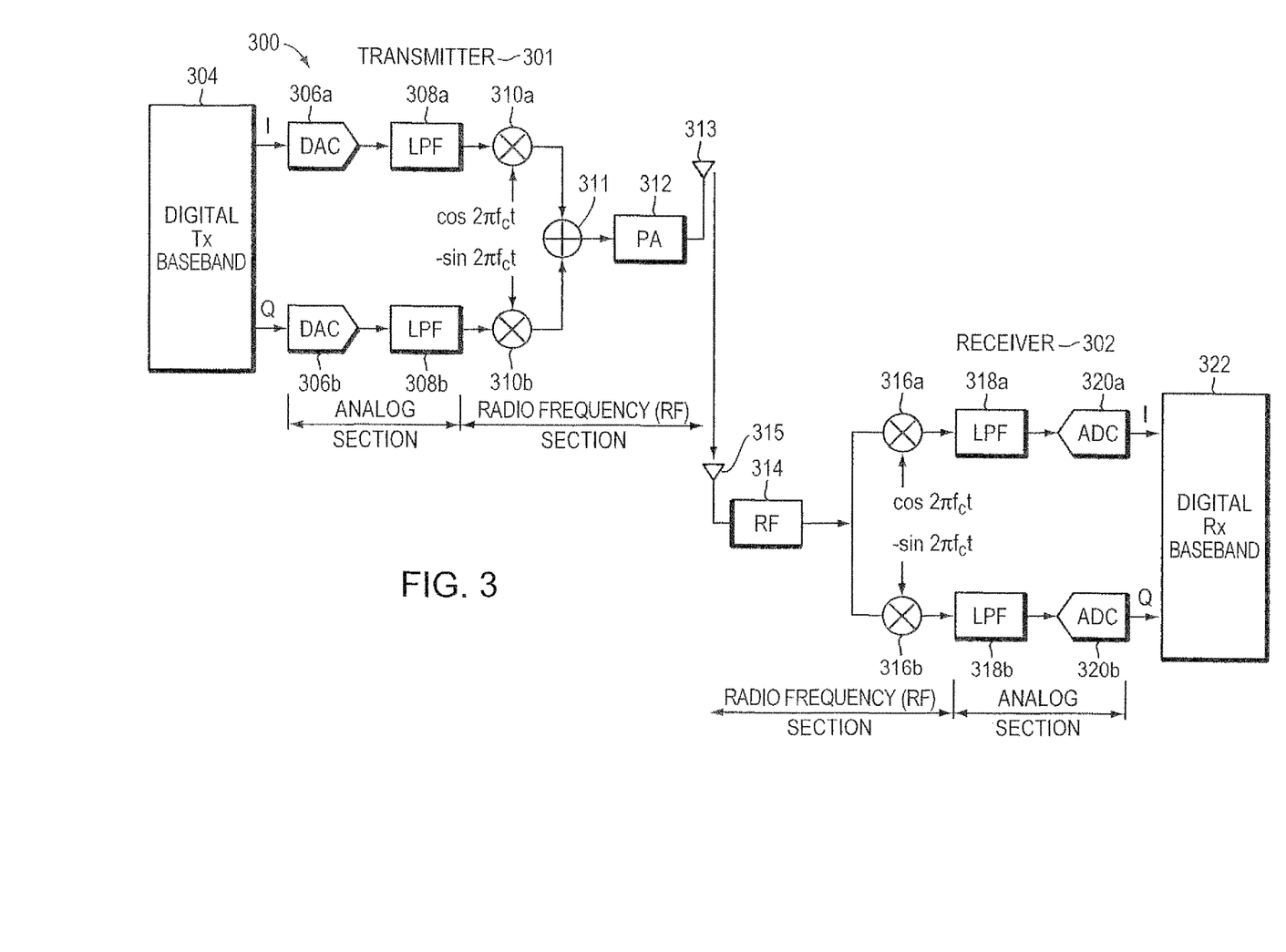
FIG. 3 is a schematic of a typical OFDM transmitter and receiver pair 300 employing a QAM scheme.

In order to distribute and transmit the various OFDM symbols, OFDM systems may employ a Quadrature Amplitude Modulation (QAM) scheme. A QAM scheme conveys data by changing or modulating the amplitudes of two carrier waves, in response to a data signal. A typical OFDM transmitter and receiver pair 300 employing a QAM scheme is shown in FIG. 3. A flow of bits to be transmitted from a digital transmitter baseband 304 is split into two equal parts, therefore generating two independent signals. The two signals are converted to analog signals via digital to analog converters (DAC) 306a and 306b. The analog signals are then passed through low pass filters (LPF) 308a and 308b. The two analog signals are then encoded separately, with one analog signal being multiplied 308a by a cosine wave and the other analog signal being multiplied 308b by a sine wave. The encoded signals are then added together 311, and the combined signal is then passed through a power amplifier 312 and transmitted with the use of an antenna 313. The receiver 302 detects the transmitted signal with the use of an antenna 315 and transmits the signal to a radio frequency receiving device 314. The received signal is then separated and decoded with the multiplication of a cosine wave 316a and a sine wave 316b. The signals are then passed through a low pass filter 318a and 318b, and thereafter, the signals are digitally transformed with the use of analog to digital converters 320a and 320b. Finally, the signals are then sent to the digital receiver baseband 322.

Figure 4:
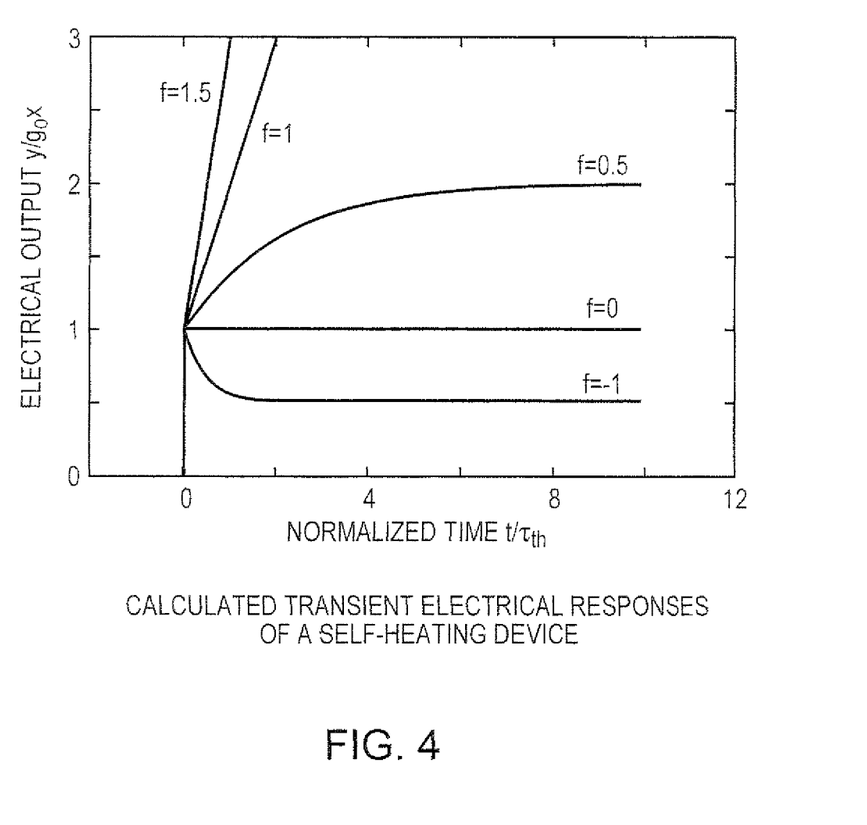
FIG. 4 is a graphical representation of a calculated transient electrical response of a self-heating device.

In the radio frequency (RF) portion of the transmitter, electromagnetic waves are generated and transmitted by alternating current fed into antenna 313. This RF section is also a region that may be susceptible to gain variations. Gain variations may be caused by a number of factors, one of which may be thermal changes in the transmitting device. FIG. 4 shows a calculated transient electrical response of a self-heating device. The self-heating effect, caused by a temperature rise due to a power dissipation and a temperature dependence of device characteristics, can be regarded as a thermal-electrical feedback inside the device (f). The y-axis of the plot represents the gain change of the device and the x-axis represents normalized time.

As may be seen in FIG. 4, the device is stable, or endures minimal gain variations with respect to time, when f<1. The device becomes unstable, or endures sustainable variations with respect to time, when f≥1. The graphical data illustrates gain changes increasing linearly with time for f=1, and exponentially with time for f>1.

Figure 5A:
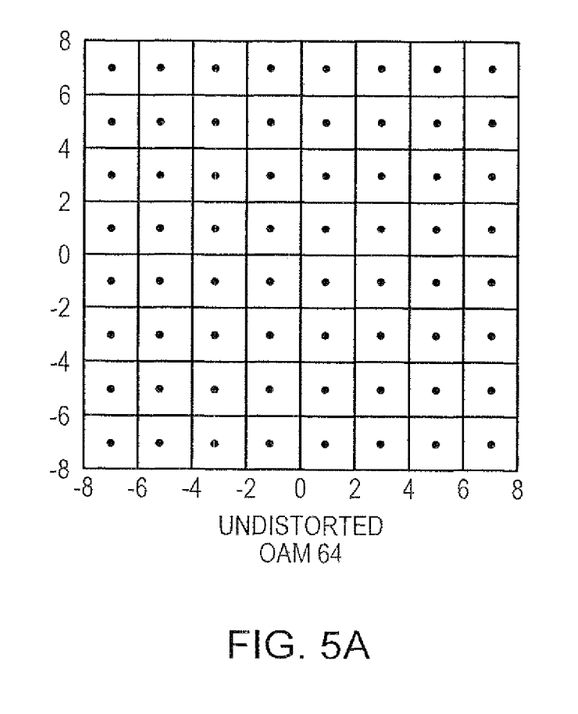
FIGS. 5A and 5B are schematics of an undistorted and distorted, respectively, QAM 64 constellation grid.
Figure 5B:
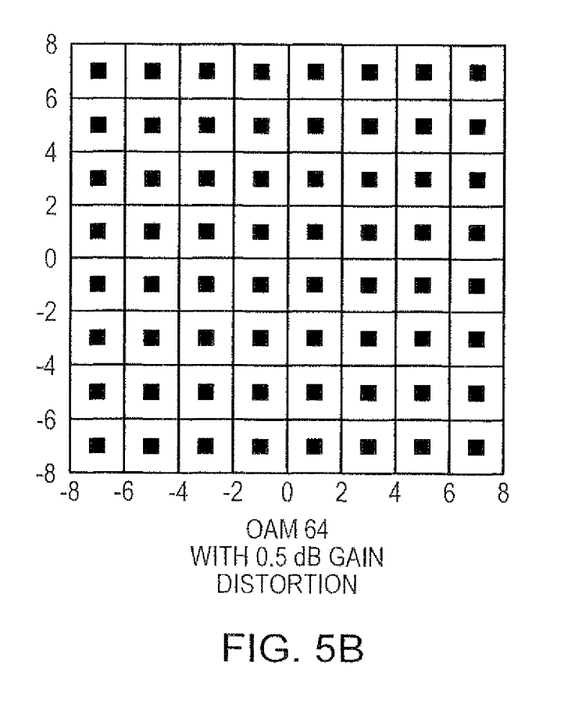

The effects of gain variations on a signal are also shown in FIGS. 5A and 5B. In an undistorted QAM constellation, points are usually arranged in a square grid with equal vertical and horizontal spacing and with the number of points on the grid typically being a power of 2, as may be seen in FIG. 5A. FIG. 5B displays a QAM 64 constellation, which may be used to support 48 and 54 Mbps rates in a typical 802.11 transmitter and receiver pair, with a 0.5 dB gain distortion. As is shown in FIG. 5B, the 0.5 dB gain distortion has caused the constellations of the QAM to become blurred and expanded. Distortions may include impairments such as group delay, discrete echoes (e.g., reflections, ghosts or multipath distortion), micro-reflections and amplitude tilt. Distortions such as the ones previously mentioned are capable of causing serious damage to upstream data. The table below records the signal to noise ratio (SNR) limit that is imposed on a signal due to gain variation or distortion.

| Power Variation (dB) | Amplitude Variation (dB) | SNR Limit (dB) |
|---|---|---|
| 0.1 | 0.05 | 38.7 |
| 0.2 | 0.10 | 32.7 |
| 0.3 | 0.15 | 29.1 |
| 0.4 | 0.20 | 26.5 |
| 0.5 | 0.25 | 24.5 |
| 0.6 | 0.30 | 22.9 |
| 0.7 | 0.35 | 21.5 |
| 0.8 | 0.40 | 20.3 |

| Power Variation (dB) | Amplitude Variation (dB) | SNR Limit (dB) |
|---|---|---|
| 0.9 | 0.45 | 19.2 |
| 1.0 | 0.50 | 18.3 |

As this table shows, a 0.25 dB gain variation in amplitude and a 0.5 variation in power will impose a 24.5 dB upper bound on the SNR. A QAM 64 or a 54 Mbps system may not function properly with such bounds since this system generally needs 27-28 dB in a typical indoor environment. Also, the 802.11 standard transmitter and receiver pair mandates a minimum error vector magnitude (EVM) of 25 dBc. With gain changes of 0.25 dB or more, the transmitter will not even meet the EVM specification (assuming that the transmitter is the source of gain variation).

Prior art methods of gain compensation have been developed in an attempt to correct the distortion caused by gain variation. Many prior art methods of gain compensation make use of the training symbols in the OFDM packet to estimate the gain. An estimation may typically be made at a time 0, or once a packet is first received. Thus, many prior art systems will evaluate the pilots of the training symbol once the packet has first arrived, 'time zero,' and estimate a gain variation. The data subcarriers of the payload symbols are then compensated based on the initial estimation made at 'time zero.' An updated estimation may be made, again at time zero, once a new packet has been received.

SUMMARY OF THE INVENTION

A method and apparatus for gain compensation of a packet in an orthogonal frequency division multiplexing (OFDM) system is discussed. The system establishing an initial magnitude estimate for a packet, determining a variation in magnitude of the packet over time, and applying to the packet a gain that varies over time. The gain may be based on the initial magnitude estimate and the variation in magnitude. The determination of the variation in magnitude may further comprise determining a pilot magnitude ratio estimation over time, and computing a pilot magnitude estimation based on the pilot magnitude ratio estimation. The pilot magnitude ratio may be normalized by a lead pilot. Pilot exclusion may also be comprised in the establishment of the variation in magnitude, wherein a pilot whose magnitude is low in accordance with an exclusion algorithm. The variation in magnitude may be updated for every OFDM symbol or alternatively may be updated after a predetermined number of OFDM symbols have been processed. The system may compute the gain compensation factor by obtaining a ratio of the initial magnitude estimate and the variation in magnitude. The gain compensation factor may comprise an operator that returns an index of a pilot associated with the data subcarrier.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Prior art methods of gain estimation and compensation are generally noisy. It is possible to degrade the performance of a modem when such noisy estimates are used to compensate for gain variations. The noisy gain estimates in prior art systems are primarily due to the fact that all gain estimations are made prior to processing the packet, at 'time zero.' Changes in gain may occur over microseconds while packet duration may occur in milliseconds. Thus, gain variations may radically affect a system and may also cause mid-packet gain variation, which may be detrimental to the data packet. Therefore, during the processing life of the packet, significant changes in gain may occur. These mid-packet changes must be accounted for in gain estimation and compensation calculations.

Figure 6:
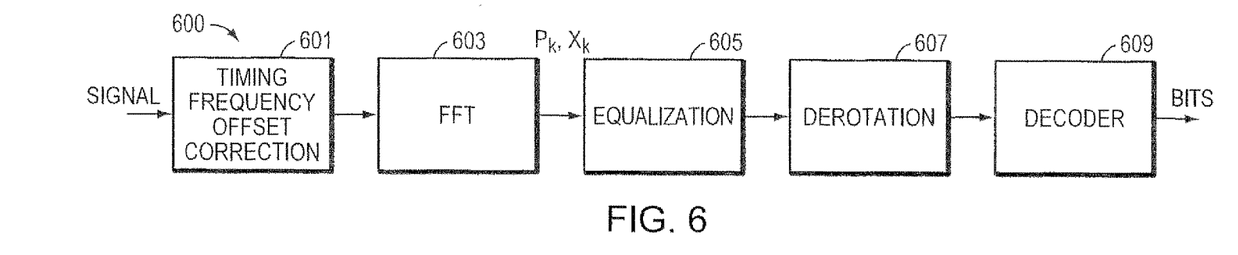
FIG. 6 is a block diagram of a canonical OFDM receiver.

FIG. 6 displays a canonical OFDM receiver 600. The receiver 600 typically first applies a timing and frequency offset correction 601 to a received signal. The timing and frequency offset correction 601 is applied to the start of an OFDM packet and synchronizes the packet in time and frequency. A Fast Fourier Transform (FFT) is then performed on the synchronized signal to produce the frequency representation of the OFDM signal comprising pilot and data subcarriers. An equalization 605 is then performed to adjust the signal such that all the pilot subcarriers are of equal value. A phase correction or derotation 607 may also be performed to correct rotational distortions. Finally the signal may be decoded 609 in order to produce bits.

As is shown in FIG. 6, the canonical OFDM receiver 600 does not account for mid-packet gain variations. Thus there is no adjustment for gain over the length, or processing life, of an OFDM packet. Furthermore, pilots may be so severely effected by gain variation that their use in gain estimation and compensation calculations may add significant noise to the estimate. The OFDM receiver 600 does not account for severely degenerated pilots in gain estimation or compensation calculations.

A system and method of gain estimation and compensation is needed which may adjust gain estimations throughout the length or processing life of an OFDM packet without introducing noise in the system. An embodiment of the present invention is to build a gain estimator that eliminates the problem of gain variation, in the receiver, without causing significant additional performance loss of its own. The receiver estimates and compensates for gain variation throughout the length, or processing time, of the OFDM packet. A method of inclusion/exclusion is also presented, where a pilot may be included or excluded based on the severity of its gain change. Thus, the inclusion/exclusion method prevents the incorporation of substantially degraded pilots in gain compensation and estimation calculations.

An important feature of first order OFDM systems is that the frequency of the OFDM symbols will remain constant over time. Hence, while pilot magnitudes may change with gain variations, their magnitude ratio will remain constant. Thus, in an embodiment of the present invention, a pilot magnitude ratio estimate is obtained for all pilots in each payload symbol. The pilot magnitude ratio estimation is obtained through a time average of pilot ratios, rather than the pilots themselves, which may be updated for every symbol. Upon obtaining the pilot magnitude ratio estimation, the pilot magnitude estimation may be found using an averaging technique. Finding the pilot magnitude estimation by using the pilot magnitude ratio estimation yields accurate results, as compared to prior art methods, due to the fact that pilot magnitude ratios remain constant during gain variations. Using the pilot magnitude estimation, a gain compensation factor may be computed and applied to each data subcarrier to therefore compensate the data.

The number of pilots herein will be denoted by the variable N. The pilot indices run from 0 through N−1. The number of payload symbols is denoted by the variable M. The training symbol is assigned index 0. It should be appreciated that if there are several training symbols, they are averaged to yield a single training symbol. The payload symbols are assigned indices 1, 2, 3 . . . M. The $i^{th}$ pilot in the $m^{th}$ OFDM symbol is denoted by $P_{m,i}$. The $k^{th}$ data subcarrier in the $m^{th}$ symbol is similarly denoted by $X_{m,k}$. It should be noted that complex signals are bold and italicized. Real signals are only bold. Variables that are not signals are only italicized. Estimates of unknown quantities are qualified with a tick ('). Hence, if H denotes a known (complex) signal, then H' is an estimate of H. Magnitude of complex numbers (i.e., their absolute value) is represented via the |.| operator.

Figure 7:
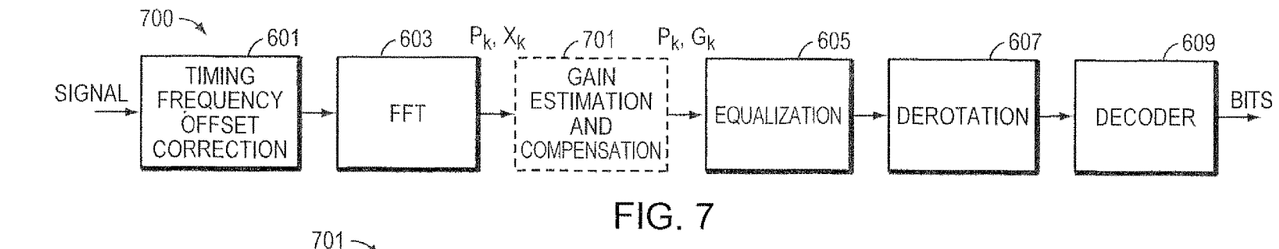
FIG. 7 is a block diagram of a OFDM receiver according to an embodiment of the present invention.
Figure 8:
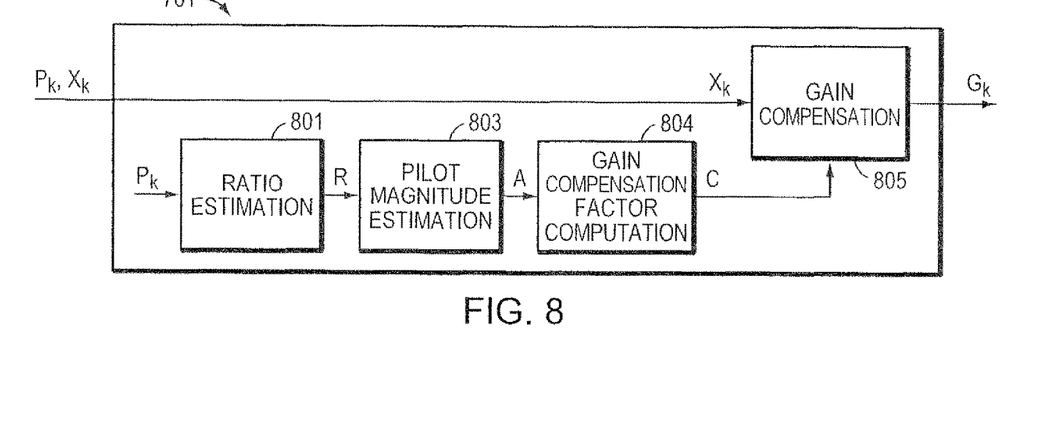
FIG. 8 is a detailed view of the computational gain estimation and compensation steps according to an embodiment of the present invention.

An illustrative example of an embodiment of the present invention is depicted in FIG. 7. The OFDM receiver 700 comprises all of the components featured in OFDM receiver 600 of FIG. 6, with the addition of a gain estimation and compensation device 701. FIG. 8 displays a block diagram of the computational steps taken by the gain estimation and compensation device 701.

Gain estimation is achieved by first performing a ratio estimation 801. The ratio estimation step 801 is a time averaging technique, which may be updated for every payload symbol. The ratio estimation step 801 may be described using the following equation:

$$R'_{m,i} = \frac{1}{m} \sum_{j=1}^{m} (|P_{j,i}|/|P_{j,lead}|) \quad (1)$$

where $R'_{m,i}$ represents the estimated ratio value of the pilots in the OFDM system; m represents the number of payload symbols included in the estimation; $|P_{j,i}|$ represents the absolute value of the $i^{th}$ pilot in the $j^{th}$ payload symbol; and $|P_{j,lead}|$ the absolute value of the lead pilot, or the pilot with the largest absolute value, in the $j^{th}$ payload system. The training pilot with the highest power (i.e., with the largest absolute value) is termed the lead pilot. The lead pilot is used as a reference when calculating relative pilot magnitude ratios. Its index is denoted by the subscript "lead."

An example output from pilot magnitude ratio estimation 801 is provided below:

$$[i]^b \begin{bmatrix} R'_{1,4} & 1/2R'_{2,4} & 1/3R'_{3,4} & 1/4R'_{4,4} \\ R'_{1,3} & 1/2R'_{2,3} & 1/3R'_{3,3} & 1/4R'_{4,3} \\ R'_{1,2} & 1/2R'_{2,2} & 1/3R'_{3,2} & 1/4R'_{4,2} \\ R'_{1,1} & 1/2R'_{2,1} & 1/3R'_{3,1} & 1/4R'_{4,1} \end{bmatrix} [m] \quad (1A)$$

where the ratio estimates are arranged horizontally by increasing payload symbol number [m] and vertically by increasing pilot number [i]. The pilot magnitude ratio is the absolute value of the pilot, for which the magnitude ratio is being estimated for, normalized by the absolute value of the lead pilot. Calculated averages of previously estimated ratios may also be taken into account and averaged over time for later processed pilots. In other words, consider row b, the calculation of $R'_{4,3}$ yields the following:

$$R'_{4,3} = (1/4)[R'_{1,3} + R'_{2,3} + R'_{3,3} + |P_{4,3}|/|P_{4,lead}|] \quad (1B)$$

In the example provided above, the estimated magnitude ratio for the pilot (i=3) in the symbol (m=4) is the average of all the previous estimates (for symbols m=1-3) for the same pilot (i=3), as well as the normalized absolute value of the pilot for which the magnitude is being estimated for ($|P_{4,3}|/|P_{4,lead}|$). Therefore, determining the pilot magnitude estimation is achieved by obtaining the normalized value of the pilot in question and averaging that value over time, similarly indexed pilots in previous symbols.

Next, the pilot magnitude, or variation in pilot magnitude, 803 is computed using the data obtained by the magnitude ratio estimation step 801. The computation of the pilot magnitude 803 may be represented by the following averaging formula:

$$A'_{m,i} = R'_{m,i} \cdot \left( \sum_{j=1}^{N} |P_{m,j}| \right) / \left( \sum_{j=1}^{N} R'_{m,j} \right) \quad (2)$$

where $A'_{m,i}$ represents the estimated pilot magnitude, $R'_{m,i}$ represents the pilot magnitude ratio estimation obtained in equation (1), and N is the total number of pilots in the $m^{th}$ symbol. The pilot magnitude estimate is obtained by summing the absolute value of all the pilots in the symbol and dividing that sum by the sum of all the pilot magnitude ratio estimates obtained for the pilots in the symbol. The result is then multiplied by the pilot ratio estimation of the pilot whose magnitude is being solved for. As an example, consider the following example:

$$A'_{2,2} = R'_{2,2} \left[ \frac{|P_{2,1} + P_{2,2} + P_{2,3} + P_{2,4}|}{R'_{2,1} + R'_{2,2} + R'_{2,3} + R'_{2,4}} \right] \quad (2A)$$

where the estimated pilot magnitude for the pilot indexed as two (j=2) in the symbol indexed as two (m=2), is the estimated pilot magnitude ratio of the pilot in question multiplied by the sum of the absolute value of all the pilots comprised in the symbol m=2, divided by the sum of all the estimated pilot magnitude ratio estimates obtained the symbol m=2. It should be appreciated that although the example illustrates only four pilots per symbol, a symbol may comprise any number of pilots. Expanding and approximating the equation, the following results:

$$A'_{2,2} = R'_{2,2} \left[ \frac{|P_{2,1} + P_{2,2} + P_{2,3} + P_{2,4}|}{\frac{1}{2}\left[\frac{1}{2}\left(\frac{|P_{1,1}|}{|P_{1,lead}|} + \frac{|P_{2,1}|}{|P_{2,lead}|}\right) + \left(\frac{|P_{1,2}|}{|P_{1,lead}|} + \frac{|P_{2,2}|}{|P_{2,lead}|}\right) + \right]}{\frac{1}{2}\left(\frac{|P_{1,3}|}{|P_{1,lead}|} + \frac{|P_{2,3}|}{|P_{2,lead}|}\right) + \left(\frac{|P_{1,4}|}{|P_{1,lead}|} + \frac{|P_{2,4}|}{|P_{2,lead}|}\right)} \right] \quad (2B)$$

$$A'_{2,2} \approx R'_{2,2} \left[ \frac{|P|}{\left(\frac{|P|}{|P_{lead}|}\right)} \right] \approx \quad (2C)$$

$$\frac{1}{2}\left(\frac{|P_{1,2}|}{|P_{1,lead}|} + \frac{|P_{2,2}|}{|P_{2,lead}|}\right)[|P_{lead}|] \approx \left(\frac{|P|}{|P_{lead}|}\right)[|P_{lead}|] \approx |P|$$

Therefore, through the use of averaging, equation (2) will yield the strength or magnitude of the $i^{th}$ pilot averaging over all the pilots and pilot magnitude ratio estimates in the $m^{th}$ payload symbol. Thus, equation (2) makes use of averaging over time with respect to payload symbols and averaging over frequency with respect to pilots. It should be appreciated that the following simplified equation may also yield a good approximation of pilot magnitude estimation:

$$A'_{m,i} = \frac{1}{m}\sum_{j=1}^{m}|P_{j,i}| \quad (2D)$$

Equation 2D is the mathematically the same as equation (1) but for the normalization with $P_{lead}$. A few of the pilots in the payload symbols may be greatly affected by the gain variation such that their magnitude is approximately equal to noise. Normalizing each pilot to the lead pilot will help to reduce the variations among pilots and reduce the amount of noise in the final estimation. Thus, as may be seen in equations (1)-(2D), a pilot magnitude may be obtained by averaging pilot signals over successive symbols over time.

Finally, a gain compensation factor is computed 805. The computation of the gain compensation factor may be represented by the following formula:

$$C'_{m,i} = |P_{0,i}|/A'_{m,i} \quad (3)$$

where $|P_{0,i}|$ is the absolute magnitude of the pilot indexed i at 'time zero,' $A'_{m,i}$ is the estimated pilot magnitude obtained during the processing life of the OFDM symbol and from equation (2), and $C'_{m,i}$ is the gain compensation factor, or an estimated value of how much the pilot has changed in magnitude. Thus, the gain compensation factor for an $i^{th}$ pilot in an $m^{th}$ symbol is obtained by obtaining the ratio of the absolute value of the pilot at a 'time zero,' in the symbol to be compensated, by the estimated pilot magnitude obtained for the pilot in equation (2). Thus, in contrast to prior art systems, the gain compensation factor 805 adjusts the gain throughout the length of the OFDM packet and does not simply estimate the gain using 'time zero' analyses. Therefore, mid-packet gain variations may be accounted for and compensated.

The gain compensation factor is applied to all the data subcarriers in the payload to compensate for changes in the front-end gain 807. The compensation of the data carriers may be represented by the following formula:

$$G_{m,k} X_{m,k} C'_{m,assoc(k)} \quad (4)$$

where $X_{m,k}$ represents the $k^{th}$ data carrier in the $m^{th}$ payload symbol, $C'_{m,assoc(k)}$ represents the gain compensation which must be applied to the data carrier, with the assoc(k) operator returning the index of the pilot associated with data subcarrier k, and $G_{m,k}$ represents the compensated data carrier. Thus, by applying the gain compensation factor to the data subcarriers, variations due to gain may be compensated for.

In the examples provided, equations (1)-(4) have been described as being updated for every incoming payload symbol. It should be appreciated that equations (1)-(4) may be updated after a set number of payload symbols have been processed. As was previously shown in FIG. 4, gain changes may vary rapidly with time (i.e., f<0), or the gain changes may be relatively stable with time (i.e., f≥0). Therefore, an optimal number of payload symbols for updating may be determined based on the rate of change of gain variations. For example, estimation and compensation steps may be updated for every payload symbol in the case of a rapidly changing gain, or may be updated for every twenty payload symbols for a relatively stable gain. It may be advantageous to include multiple payload symbols before updating estimation and compensation calculations, since doing so will decrease the amount of noise introduced in the system.

The scheme discussed above is best suited for the ideal case in which all pilots comprise an identical SNR. Frequently it may be the case that one or more pilots comprise a SNR that is significantly lower than that of the lead pilot. In fact, some pilots may be so severely faded that the faded pilots are comprised mostly of noise. Therefore, a significant amount of noise may be incorporated into the gain estimation and compensation.

As was previously mentioned, normalization of pilots may help alleviate the problem of severely faded pilot magnitudes but a more sophisticated method further reduces the incorporation of noise in estimation and compensation calculations. A pilot inclusion and exclusion method and algorithm has been developed to eliminate pilot noise from gain estimation and compensation. The elimination of pilot noise is accomplished by excluding pilots whose absolute magnitude has been greatly reduced by gain variations. To determine which pilots are to be included or excluded, all pilots are ordered according to their absolute magnitude values in the training symbol. Therefore, the lead pilot will always have an index of zero and so on. The lead pilot will also always be included in the estimation calculations. Inclusion decisions of all the other pilots are made in descending order of their strength. A pilot, indexed i, will be included if and only if the previous pilot, or the pilot indexed i−1, has been included and if the following equation, or algorithm, is satisfied for the pilot indexed i:

$$|P_{0,i}| > \left(\sum_{j=0}^{i-1} |P_{0,j}|\right)\left(\sqrt{\frac{i}{\sum_{j=0}^{i-1}|P_{0,j}|^2}} - 1\right) \quad (5)$$

where $|P_{0,i}|$ represents the absolute value of the $i^{th}$ pilot, $$\sum_{j=0}^{i-1}|P_{0,j}|, \text{ and } \sum_{j=0}^{i-1}|P_{0,j}|^2$$

represent the sum and squared sum of the absolute value, respectively, of all pilots indexed 0-'i−1.'

Alternatively, a simpler inclusion/exclusion scheme may be devised. For example, setting a threshold t, wherein t<1. All the pilots may be multiplied by the threshold t, where only the pilots whose absolute magnitude is greater than the lead pilot, upon multiplication by t, will be included in the estimation. While more sophisticated inclusion/exclusion strategies may allow for better performance, the improved performance may come at the cost of additional hardware. Thus a suitable balance may be determined for individual signal processing needs.

All the gain estimation and compensation steps, represented by equations (1)-(4) will remain the same for the included pilots. If the associated pilot of a data carrier has been excluded, the closest included pilot to that data carrier will be used for gain compensation.

Figure 9:
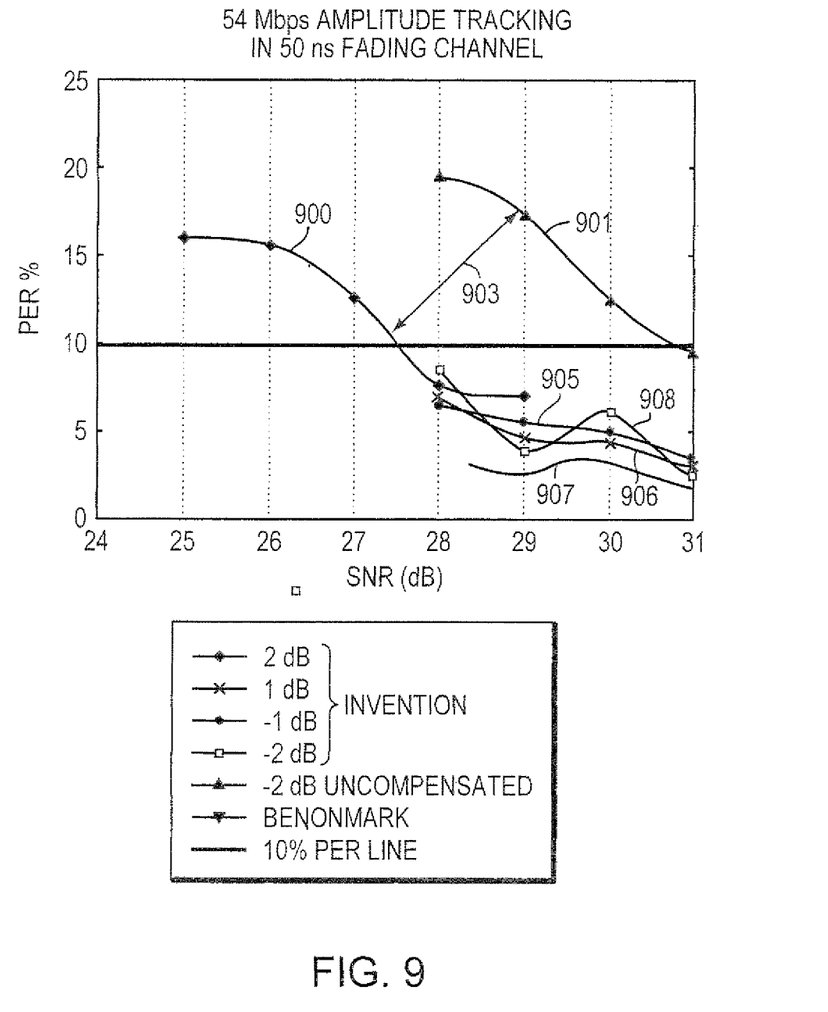
FIG. 9 is a graphical representation of results obtained using methods and systems according to embodiments of the prior art and the present invention.

A graphical representation of results, obtained in part by using the above mentioned embodiments of the invention, is shown in FIG. 9. The benchmark represents a 54 Mbps packet error rate (PER) vs. SNR curve 900 in a 50 ns multipath environment with no gain distortion. A curve with a −2 dB uncompensated gain variation 901 is also plotted. It is desirable to estimate and compensate for gain in order to close the gap 903 between the benchmark curve 900 and the uncompensated −2 dB gain variation curve 901, so that curve 903 may resemble the benchmark 900 as much as possible. Curves 905-908 show plotted data with 2 dB, 1 dB, −1 dB, and −2 dB gain variations, respectively; whose gain has been estimated and compensated according to an embodiment of the present invention. As may be seen from FIG. 9, curves 905-908 all show a significant decrease in PER while maintaining a high SNR. Curves 905-908 also over lap the benchmark curve 900 as well as decrease gap 903.

While this invention has been particularly shown and described with references to example embodiments thereof, it will be understood by those skilled in the art that various changes in form and details may be made therein without departing from the scope of the invention encompassed by the appended claims.

What is claimed is:

1. An orthogonal frequency division multiplexing (OFDM) system comprising:
    an OFDM transmitter operable to transmit a signal comprising a data subcarrier k within a symbol m of a packet, the symbol m being one of a plurality of symbols within the packet and the data subcarrier k being associated with a pilot indexed i of a plurality of pilots within the symbol m; and
    an OFDM receiver operable to determine a pilot magnitude ratio estimate for the pilot i of the symbol m using one or more previously calculated pilot magnitude ratio estimates for similarly indexed pilots in previous symbols and a normalized magnitude of the pilot i; and to determine an estimate pilot magnitude for the pilot i using the pilot magnitude ratio estimate for the pilot i of the symbol m, a sum of pilot magnitude ratio estimates for the plurality of pilots in the symbol m, and a sum of values for a plurality of pilots in the symbol m.

2. The system of claim 1, wherein, to determine the pilot magnitude ratio estimate for the pilot i of the symbol m, the OFDM receiver is operable to average the one or more previously calculated pilot magnitude ratio estimates for similarly indexed pilots in previous symbols and the normalized magnitude of the pilot i.

3. The system of claim 1, wherein, to determine an estimate pilot magnitude for the pilot i, the OFDM receiver is operable to divide the pilot magnitude ratio estimate for the pilot i of the symbol m by the sum of pilot magnitude ratio estimates for the plurality of pilots in the symbol m, and multiple it by the sum of values of a plurality of pilots in the symbol m.

4. The system of claim 1, wherein the sum of values of a plurality of pilots in the symbol m comprises a sum of an absolute value of a plurality pilots in the symbol m.

5. The system of claim 1, wherein the OFDM receiver is further operable to determine a gain compensation factor to be applied to the subcarrier k associated with the pilot i of the symbol m using the estimate pilot magnitude for the pilot i of the symbol m.

6. The system of claim 5, wherein, to determine the gain compensation factor to be applied to the subcarrier k associated with the pilot i of the symbol m, the OFDM receiver is operable to divide an absolute value of a pilot indexed i for the symbol m at a time zero by the estimate pilot magnitude for the pilot i of the symbol m.

7. The system according to claim 1, wherein the OFDM receiver is further operable to determine the plurality of pilots in the symbol m to use to determine the estimate pilot magnitude for the pilot i by excluding pilots whose absolute magnitude has been substantially reduced by gain variations.

8. The system according to claim 1, wherein the OFDM receiver is further operable to determine the plurality of pilots in the symbol m to use to determine the estimate pilot magnitude for the pilot i by ordering pilots according to their absolute magnitude values in the training symbol and including pilots based on descending order of their strength.

9. The system according to claim 1, wherein the OFDM receiver is further operable to determine the plurality of pilots in the symbol m to use to determine the estimate pilot magnitude for the pilot i by including a pilot indexed j if the pilot indexed j−1 is included and if the absolute value of the pilot indexed j is greater than a sum of the absolute value of all pilots indexed 0 to j−1 multiplied by X−1, X being a square root of j divided by a squared sum of the absolute value of all pilots indexed 0 to j−1.

10. The system according to claim 1, wherein the OFDM receiver is further operable to determine the plurality of pilots in the symbol m to use to determine the estimate pilot magnitude for the pilot i by multiplying pilots by a threshold t that is less than one and including pilots whose absolute magnitude is greater than the lead pilot, upon multiplication by the threshold t.

11. An orthogonal frequency division multiplexing (OFDM) receiver comprising:
    a first element operable to produce a frequency representation of an OFDM signal, the OFDM signal comprising a data subcarrier k within a symbol m of a packet, the symbol m being one of a plurality of symbols within the packet and the data subcarrier k being associated with a pilot indexed i of a plurality of pilots within the symbol m;
    a second element operable to determine a pilot magnitude ratio estimate for the pilot i of the symbol m using one or more previously calculated pilot magnitude ratio estimates for similarly indexed pilots in previous symbols and a normalized magnitude of the pilot i; and to determine an estimate pilot magnitude for the pilot i using the pilot magnitude ratio estimate for the pilot i of the symbol m, a sum of pilot magnitude ratio estimates for the plurality of pilots in the symbol m, and a sum of values for a plurality of pilots in the symbol m.

12. The OFDM receiver of claim 11, wherein, to determine the pilot magnitude ratio estimate for the pilot i of the symbol m, the second element is operable to average the one or more previously calculated pilot magnitude ratio estimates for similarly indexed pilots in previous symbols and the normalized magnitude of the pilot i.

13. The OFDM receiver of claim 11, wherein, to determine an estimate pilot magnitude for the pilot i, the second element is operable to divide the pilot magnitude ratio estimate for the pilot i of the symbol m by the sum of pilot magnitude ratio estimates for the plurality of pilots in the symbol m, and multiple it by the sum of values of a plurality of pilots in the symbol m.

14. The OFDM receiver of claim 11, wherein the sum of values of a plurality of pilots in the symbol m comprises a sum of an absolute value of a plurality pilots in the symbol m.

15. The OFDM receiver of claim 11, wherein the second element is further operable to determine a gain compensation factor to be applied to the subcarrier k associated with the pilot i of the symbol m using the estimate pilot magnitude for the pilot i of the symbol m.

16. The OFDM receiver of claim 15, wherein, to determine the gain compensation factor to be applied to the subcarrier k associated with the pilot i of the symbol m, the second element is operable to divide an absolute value of a pilot indexed i for the symbol m at a time zero by the estimate pilot magnitude for the pilot i of the symbol m.

17. The OFDM receiver according to claim 11, wherein the second element is further operable to determine the plurality of pilots in the symbol m to use to determine the estimate pilot magnitude for the pilot i by excluding pilots whose absolute magnitude has been substantially reduced by gain variations.

18. The OFDM receiver according to claim 11, wherein the second element is further operable to determine the plurality of pilots in the symbol m to use to determine the estimate pilot magnitude for the pilot i by ordering pilots according to their absolute magnitude values in the training symbol and including pilots based on descending order of their strength.

19. The OFDM receiver according to claim 11, wherein the second element is further operable to determine the plurality of pilots in the symbol m to use to determine the estimate pilot magnitude for the pilot i by including a pilot indexed j if the pilot indexed j−1 is included and if the absolute value of the pilot indexed j is greater than a sum of the absolute value of all pilots indexed 0 to j−1 multiplied by X−1, X being a square root of j divided by a squared sum of the absolute value of all pilots indexed 0 to j−1.

20. The OFDM receiver according to claim 11, wherein the second element is further operable to determine the plurality of pilots in the symbol m to use to determine the estimate pilot magnitude for the pilot i by multiplying pilots by a threshold t that is less than one and including pilots whose absolute magnitude is greater than the lead pilot, upon multiplication by the threshold t.

* * * * *